United States Patent [19]

Paull et al.

[11] 3,976,443

[45] *Aug. 24, 1976

[54] SYNTHESIS GAS FROM SOLID CARBONACEOUS FUEL

[75] Inventors: Peter L. Paull, Weston, Conn.; Warren G. Schlinger, Pasadena, Calif.

[73] Assignee: Texaco Inc., New York, N.Y.

[ * ] Notice: The portion of the term of this patent subsequent to Aug. 24, 1993, has been disclaimed.

[22] Filed: Dec. 18, 1974

[21] Appl. No.: 534,057

[52] U.S. Cl. .............................. 48/197 R; 48/203; 48/210; 252/373; 423/415 R
[51] Int. Cl.² ............................................ C10J 1/00
[58] Field of Search ................. 48/197 R, 210, 203, 48/209, 206; 252/373; 423/415

[56] References Cited
UNITED STATES PATENTS

| | | |
|---|---|---|
| 3,723,344 | 3/1973 | Reynolds ............................ 252/373 |
| 3,868,817 | 3/1975 | Marion et al. ....................... 48/215 |

Primary Examiner—Robert L. Lindsay, Jr.
Assistant Examiner—George C. Yeung
Attorney, Agent, or Firm—T. H. Whaley; C. G. Ries; Albert Brent

[57] ABSTRACT

This is an improved continuous partial oxidation process for producing synthesis gas or fuel gas from a solid carbonaceous fuel. Liquid $CO_2$ and a ground solid carbonaceous fuel such as coal are mixed together to produce a pumpable slurry feed. The $CO_2$ serves as a carrier for the carbonaceous fuel and as a temperature moderator, and is preferably obtained by purifying the product gas.

12 Claims, 1 Drawing Figure

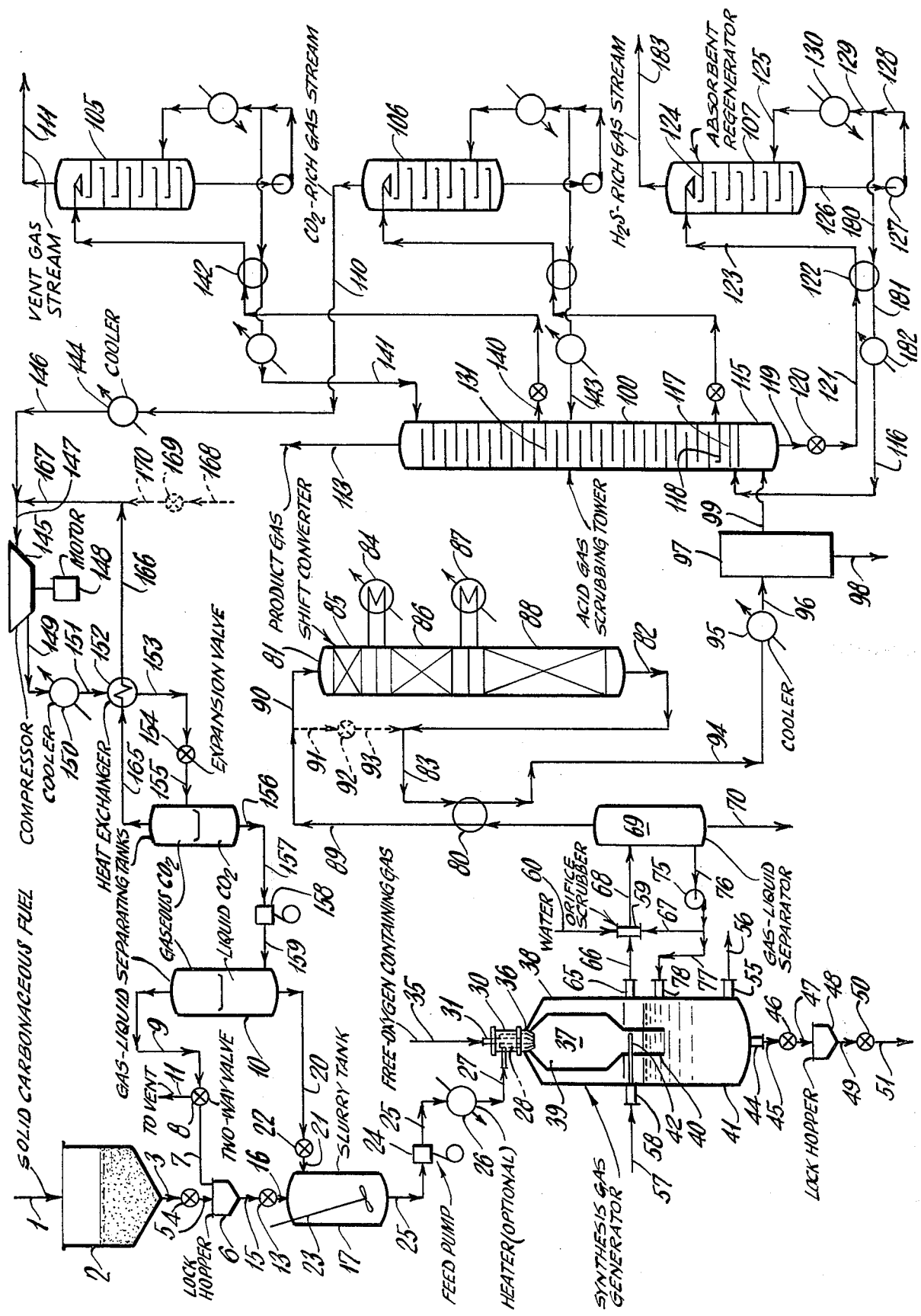

SYNTHESIS GAS FROM SOLID CARBONACEOUS FUEL

BACKGROUND OF THE INVENTION

1. Field of the Invention

This invention relates to a continuous process for the production of a CO-rich gas stream by the partial oxidation of a carbonaceous fuel. More specifically, the present invention relates to the production of synthesis gas by noncatalytic partial oxidation starting with liquid $CO_2$, solid carbonaceous fuel e.g. ground coal, and a free-oxygen containing gas e.g. air, or substantially pure oxygen.

2. Description of the Prior Art

Oil embargoes coupled with already developing petroleum shortages have led to an energy crisis in this country. To help meet the accelerating demand for energy, exploration and development of conventional petroleum resources have been stepped up. However, long-term solutions demand that alternate energy resources be developed and utilized to the maximum degree. Coal is the most promising raw material in the USA for the production of synthetic natural gas (SNG) and synthesis gas i.e. mixtures of $CO+H_2$. In the U.S. in 1970 the estimated recoverable coal reserves assuming 50 percent recovery were about 778 billion short tons. In comparison in the U.S. in 1974 the proved reserves of crude oil amounted to about 35 billion barrels.

$H_2O$ is commonly used as a temperature moderator in the partial oxidation of hydrocarbonaceous fuels to produce synthesis gas. However, problems with water as a temperature moderator are encountered with solid carbonaceous fuels when water soluble solids separate and precipitate on heating surfaces in the system. Further, the high heat of vaporization of water reduces thermal efficiency. In coassigned U.S. Pat. No. 3,705,108 inert gases including $CO_2$ were suggested to control the heat liberated by combustion of oil.

Nothing in the prior art teaches or suggests the subject invention wherein liquid carbon dioxide is mixed with a solid carbonaceous fuel e.g. ground coal to produce a pumpable slurry which is fed to an unpacked free-flow noncatalytic gas generator, where reaction takes place by partial oxidation to produce a CO-rich synthesis gas or fuel gas.

SUMMARY

This is a continuous process for producing a gas stream principally comprising gases selected from the group consisting of CO, $CO_2$, $H_2$, $H_2O$, $CH_4$, $H_2S$, COS, $N_2$, A, and mixtures thereof comprising: mixing liquid $CO_2$ and solid particles of carbonaceous fuel together in a mixing zone to produce a substantially water-free pumpable slurry; introducing said slurry at a temperature in the range of above about $-69°$ to $1200°F$. and free-oxygen containing gas into the reaction zone of a free-flow noncatalytic gas generator; and reacting said carbonaceous fuel and free oxygen containing gas by partial oxidation in said reaction zone at an autogenous temperature in the range of about $1200°$ to $3000°F$. and a pressure in the range of above about 30 to 4400 psia. $CO_2$ in the product gas may be recovered, liquefied and recycled to the mixing zone step as said liquid $CO_2$ slurrying agent. The $CO_2$ also serves as a temperature moderator in the reaction zone.

DESCRIPTION OF THE INVENTION

The present invention pertains to an improved continuous partial oxidation process for producing gas mixtures containing for example $H_2$ and CO starting with slurries of liquid $CO_2$ and solid particles of carbonaceous fuel.

Some of the advantages to be gained by using a liquid $CO_2$-rich stream as a solid carbonaceous fuel transport medium and temperature moderator in place of $H_2O$ in the production of synthesis gas by partial oxidation include: (1) reliable steady and controllable feeding of comparatively low cost high sulfur containing solid fuel feed materials; (2) reduced heat load on the gas generator with correspondingly lower oxygen requirements and higher product gas make per unit of feed; (3) elimination of heat exchanger fouling which results from vaporizing a coal-water slurry external to the burner; (4) avoiding excessive duty and temperature degradation of recoverable heat when using a waste boiler to recover heat from the synthesis gas to allow greater efficiency of heat recovery; (5) reduction of single pass carbon make by means of the reaction $C+CO_2 \rightarrow 2 CO$; (6) production of sulfur-free synthesis gas having a high CO content, and (7) because of its heat capacity, less heat is required to raise the $CO_2$ to the proper temperature.

The solid carbonaceous fuels are preferably ground to a particle size so that 100% of the material passes through an ASTM E 11-70 Sieve Designation Standard 425 $\mu m$ (Alternative No. 40) and at least 80% passes through an ASTM E 11-70 Sieve Designation Standard 75 $\mu m$ (Alternative No. 200). 1000 $\mu m$ = 1mm. The ground solid carbonaceous fuel is then introduced into a storage hopper at room temperature and atmospheric pressure.

The term solid carbonaceous fuel, as used herein to describe suitable solid carbonaceous and hydrocarbonaceous feedstocks, is intended to include various materials and mixtures thereof from the group consisting of coal, coke from coal, char from coal, petroleum coke, particulate carbon soot, oil shale, tar sands, and pitch. All types of coal may be used including anthracite, bituminous, and lignite. The particulate carbon may be that which is obtained as a by-product of the subject partial oxidation process (to be further described), or that which is obtained by burning fossil fuels. The term solid carbonaceous fuel also includes by definitions semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The moisture content of the solid carbonaceous fuel particles is in the range of about 0 to 2 weight percent and preferably 0 to 1 weight percent. Predrying may be required in some instances to reach these levels.

By means of a lock hopper system which maintains the system pressure, the particles of solid carbonaceous fuel are continuously introduced into a slurry tank along with a continuous water-free liquid $CO_2$-rich stream. The weight ratio of $CO_2$ to solid carbonaceous fuel in the feed stream is in the range of about 0.6 to 2, and preferably in the range of about 0.9 to 1.1. It is common practice to express ratios in this manner. Alternatively, it may be expressed as follows: 0.6 to 2.0 lbs. of liquid $CO_2$ are present in the slurry feed stream for each lb. of solid carbonaceous fuel. Pumpable slurries are obtained by mixing together the materials in said slurry tank at a temperature in the range of above the triple point temperature of $CO_2$ i.e. above $-69.9°F.$, say $-69°F.$ to a temperature of about 80°F. and preferably at a temperature in the range of about 32° to 40°F.

The pressure in the mixing zone is in the range of above the triple point pressure of $CO_2$ i.e., above 75.1 psia say 76 psia (pounds per square inch absolute), to a pressure of about 4500 psia, for example the range of above about 76 to 1000 psia, preferably 450 to 1500 psia, and advantageously 250 to 750 psia. To prevent any $H_2O$ in the feed from precipitating out as ice, the temperature of the slurry is preferably maintained above 32°F. The solids content in the pumpable slurry is in the range of about 40 to 60 wt. % (weight percent), and preferably in the range of about 50 to 60 wt. %.

The apparent viscosity of the pumpable slurry is in the range of about 50 to 1000 centipoise, and preferably in the range of about 100 to 500 centipoise.

The $CO_2$-solid carbonaceous fuel feed stream is reacted with a stream of free-oxygen containing gas in the reaction zone of a free flow unpacked noncatalytic synthesis gas generator. The $CO_2$-solid carbonaceous fuel feed may be supplied to the reaction zone of the gas generator preferably by way of the annulus of a annulus-type burner at a temperature in the range of above about $-69°$ to 1200°F. Thus, a liquid $CO_2$-solid carbonaceous fuel feed stream may be pumped into the gas generator in liquid phase at a temperature in the range of above about $-69°$ to 80°F. and a pressure in the range of above about 76 to 4500 psia., or it may be preferably preheated to produce a dense phase gas-liquid dispersion of solid carbonaceous fuel in gaseous $CO_2$ at a temperature in the range of about 100° to 900°F. and a pressure in the range of above about 76 to 4500 psia.

Simultaneously, a stream of free-oxygen containing gas is supplied to the reaction zone of the gas generator by way of a free passage in the burner, and preferably through the central passage at a temperature in the range of about 80° to 500°F. and preferably in the range of about 200° to 300°F. and a pressure in the range of above about 76 to 4500 psia, and preferably in the range of about 200 to 1500 psia.

In one embodiment of the invention a relatively minor amount of $H_2O$ at a temperature in the range of about 50° to 1000°F. is introduced into the reaction zone of the gas generator. The amount of $H_2O$ is less than 0.2 parts by weight of $H_2O$ per part by weight of fuel and this is less than that used in the prior art. Preferably the weight ratio is 0.01 to 0.15 parts by weight of $H_2O$ per part by weight of cabonaceous fuel. The $H_2O$ may be in the form of steam or liquid water. Including $H_2O$ in the free-oxygen containing gas may increase the life of the burner tip.

The term free-oxygen containing gas, as used herein is intended to include air, oxygen-enriched air, i.e., greater, than 21 mole % oxygen, and substantially pure oxygen i.e., greater than 95 mole % oxygen, (the remainder comprising $N_2$ and rare gases).

In one embodiment of the process as shown in the drawing for this specification, the discharge end of an annulus type burner assembly is inserted into the reaction zone of a compact unpacked free-flow noncatalytic refractorylined synthesis gas generator. The discharge end of the annulus burner comprises an axially disposed center conduit through which a stream of free-oxygen containing gas is passed surrounded by an annular passage through which the $CO_2$-solid fuel feed mixture or dispersion may be passed. Near the tip of the burner the annular passage converges inwardly in the shape of a hollow right cone. The $CO_2$-solid fuel feed stream is thereby accelerated and discharged from the burner as a high velocity conical stream. When the high velocity stream of oxidizing gas passing through the center passage hits the relatively low velocity stream of the feed mixture or dispersion the particles of solid carbonaceous fuel impinge against one another and are fragmented still further. The discharge velocity of the $CO_2$-solid fuel feed mixture or dispersion from the burner may be in the range of about 5 to 500 feet per second (ft. per sec.) and preferably in the range of about 5 to 50 ft. per sec., and advantageously 100 to 300 ft. per sec. at the burner tip. The discharge velocity of the free-oxygen containing gas is in the range of about 110 ft. per sec. to sonic velocity at the burner tip, and preferably in the range of about 200 to 600 ft. per sec. Most suitably, the relative velocity difference between the aforesaid two streams being simultaneously discharged from the burner should be at least 100 ft. per sec. Further, the feed to the burner may be reversed. In such instance, said, $CO_2$-carbonaceous fuel feed mixture or dispersion is passed through the center passage while the free-oxygen containing gas is passed through the annulus passage.

The relative proportions of solid carbonaceous fuel, $CO_2$, and free-oxygen in the reaction zone of the gas generator are such as to ensure an autogenous temperature in the gas generation zone within the range of about 1200° to 3000°F. such as about 1700° to 3000°F. and to produce a particulate carbon-ash phase containing about 0.1 to 20 weight percent (wt. %) of the organic carbon in the feed, and preferably about 1 to 4 wt. %. The particulate phase is entrained in the effluent gas stream leaving the reaction zone along with any noncombustible slag. Other operating conditions in the gas generator include: pressure in the range of above about 30 to 4400 psia and preferably 450 to 1500 psia; atoms of free-oxygen plus atoms of organically combined oxygen in the solid carbonaceous fuel per atom of carbon in the solid carbonaceous fuel (O/C atomic ratio) may be in the range of 0.7 to 1.6; more specifically with substantially pure oxygen feed to the reaction zone the broad range of said O/C atomic ratio may be about 0.7 to 1.5 and preferably about 0.8 to 1.2, with air feed to the reaction zone the broad range may be about 0.8 to 1.6 and preferably about 0.9 to 1.4; weight ratio of $CO_2$ to solid carbonaceous fuel feed in the range of about 0.5 to 2.0 and preferably about 0.7 to 1.0; and a time in the reaction zone in the range of about 1 to 10 seconds, and preferably in the range of about 2 to 8. With substantially pure oxygen feed to the gas generator, the composition of the effluent gas from the gas generator in mole % dry basis may be as follows: $H_2$ 5 to 25, CO 40 to 75, $CO_2$ 5 to 25, $CH_4$ 0.01 to 3, $H_2S + COS$ 0 to 5, $N_2$ nil to 5, and A nil to 1.5. With air feed to the gas generator, the composition of the generator effluent gas in mole % dry basis may be about as follows: $H_2$ 2 to 20, CO 15 to 35, $CO_2$ 5 to 25, $CH_4$ 0 to 2; $H_2S+COS$ 0 to 3, $N_2$ 45 to 70, and A 0.1 to 1.5.

The hot gaseous effluent stream from the reaction zone of the synthesis gas generator is quickly cooled below the reaction temperature to a temperature in the range of about 300°–700°F. In one embodiment of our invention, the hot gaseous effluent stream is cooled below the reaction temperature by direct quenching with a water spray. For example, the cooling water may contact the effluent gas stream in a quench vessel or chamber located below the reaction zone of said gas generator.

An interconnecting passage between the reaction zone and the quench zone through which the hot effluent gases may pass substantially equalizes the pressure in the two zones. Recycle water from the carbon recovery zone or lean carbon-water dispersion to be further described may be introduced through a spray ring at the top of the quench zone. Large quantities of steam are generated in the quench vessel and saturate the process gas stream. This may provide the additional steam required for subsequent water-gas shift reaction.

Substantially all of the solids are scrubbed from the effluent gas. A dispersion of unconverted particulate carbon-ash and quench water is thereby produced. Any residual solids in the scrubbed effluent synthesis gas leaving the quench chamber may be removed by means of an additional water scrubbing in a conventional venturi or jet scrubber, such as described in Perry's Chamical Engineers Handbook, Fourth Edition, McGraw Hill Co., 1968, pages 18–55 to 56.

Noncombustible solid particles such as ash, slag, silt, metal constituents, and other solids which do not disperse in the quench water drop to the bottom of the quench vessel where they are periodically removed through a lock hopper system. This residue has some commercial value and may be used for example as a soil improver. For example, coal ash may be removed from the flanged exit port at the bottom of the quench tank by way of the lock hopper system shown in the drawing. For each 100 pounds of raw ground coal fed to the gas generator about 0 to 50 pounds of ash are produced. On a dry basis the ash residue may comprise in wt. %: $SiO_2$ 10 to 50, $Al_2O_3$ 10 to 50, iron oxides and sulfides 0 to 40, and others.

Alternately, the hot effluent gas stream from the reaction zone of the synthesis gas generator may be partially cooled to a temperature in the range of about 300° to 650°F. by indirect heat exchange in a waste heat boiler. Most of the ash drops out of the effluent stream by gravity. The remaining entrained solid particles may be then scrubbed from the effluent synthesis gas by contacting and further cooling the effluent stream of synthesis gas with quench water in a gas-liquid contact apparatus, for example, a spray tower, venturi or jet scrubber, bubble plate contactor, packed column or in a combination of said equipment. For a detailed description of cooling synthesis gas by means of waste-heat boiler and a scrubbing tower, reference is made to coassigned U.S. Pat. No. 2,999,741, issued to R. M. Dille et. al.

When substantially pure oxygen is fed to the gas generator, the synthesis gas leaving the cooling and scrubbing zone may be purified and used as a source of feed gas for the synthesis of hydrocarbons or oxygen-containing organic compounds.

It is important with respect to the economics of the process that the solid particles e.g. particulate carbon and ash be removed from the cooling and scrubbing water to permit the resulting clear water to be recycled and reused for cooling and scrubbing additional synthesis gas. This may take place in a liquid-solids separating zone.

In the liquid-solids separating zone any conventional method may be used for producing separate streams of clear water, ash, and particulate carbon. For example, a particulate carbon-ash-water dispersion may be introduced into a suitable standard gravity sedimentation unit or settler. Clear water is drawn off and recycled to the synthesis gas cooling and scrubbing zone. Froth flotation may be used to produce separate streams of ash and thickened slurry of carbon and water. The carbon-water slurry may be dried to produce dry solid particulate carbon containing low ash which may be ground and recycled to the feed hopper as a portion of the solid carbonaceous fuel.

Since $CO_2$ is consumed in the reaction zone, supplemental $CO_2$ from an outside source may be supplied to the system. Preferably, however, the supplemental $CO_2$ may be produced in the system while simultaneously increasing the hydrogen content by catalytic water-gas shift. For example, all or a portion of the scrubbed synthesis gas with or without the addition of supplemental $H_2O$ may be reacted at a temperature in the range of about 600° to 1000°F. over a conventional water-gas shift catalyst e.g. 85 wt. % of $Fe_2O_3$ and 15 wt. % of $Cr_2O_3$ to convert the CO into $H_2$ and $CO_2$. Alternatively, cobalt molybdate shift catalyst may be used. The shifted and unshifted portions of the process gas stream are then combined.

The process gas stream is then cooled to condense out and separate $H_2O$. Carbon dioxide and other acid gas constituents may be removed next by conventional procedures including refrigeration or chemical absorption with methanol, hot potassium carbonate, alkanolamine solutions, or other absorption materials. By this means, the dry process gas stream may be split into the following gaseous streams:

a. a dry $CO_2$-rich gas stream substantially comprising $CO_2$ and minor amounts of $H_2S$ and COS impurities. The composition of this stream in mole % may be about $CO_2$ 90 to 100, $H_2S$ 0 to 10, and COS 0 to 1.0;

b. optionally, a vent gas stream comprising substantially pure $CO_2$ and which may contain a trace of $H_2S$ i.e. less than 1–5 parts per million (ppm) of $H_2S$ which may be safely discharged to the atmosphere without causing pollution. In another embodiment this stream may be eliminated.

c. a dry $H_2$-rich gaseous stream comprising gases from the group $H_2S$, COS, $CO_2$ and mixtures thereof. This gas stream may comprise the remainder of all of the $H_2S$ produced, substantially all of the COS produced, and the balance $CO_2$. The composition of this stream in mole % may be about $H_2S$ 20 to 50, and COS 0 to 2, and the balance carbon dioxide.

d. a dry product gas stream substantially comprising CO and $H_2$. When the free-oxygen containing gas is substantially pure oxygen the composition of this stream in mole % dry basis may be about CO 50 to 70, $H_2$ 30 to 50, $N_2$ nil to 5, and A nil to 1.5; and after water-gas shift and $CO_2$ removal the gas composition in mole % may be about CO 0.5 to 10, $H_2$ 90 to 98, $N_2$ nil to 5, and A nil to 1.5. When the free oxygen containing gas is air, the composition of this stream in mole % dry basis may be about CO 15 to 40, $H_2$ 10 to 35, $N_2$ 40 to 70, and A 0.5 to 1.0, and with water-gas shift and $CO_2$ removal the gas composition in mole % may be about CO 0.5 to 2, $H_2$ 35 to 60, $N_2$ 40 to 70, and A 0.5 to 1.0.

The dry $CO_2$-rich gas stream (stream $a$), optionally in admixture with vent gas stream ($b$), is then liquefied. A portion of said liquid $CO_2$-rich stream may be recycled to the slurry tank as said water-free liquid $CO_2$-rich stream, and another portion may be used to pressurize the feed lock hopper. $CO_2$ liquefaction may be accomplished by any conventional refrigeration process. Autorefrigeration is particularly advantageous when the process gas stream is at high pressure. The $CO_2$-rich gas stream may be liquefied by the following steps: turbocompression, cooling, gas-liquid separation, heat exchange, gas-liquid separation, expansion by means of expansion valve or turbine.

The dry $H_2S$-rich gaseous stream (stream $c$) may be sent to a conventional Claus unit where it is burned with air to produce solid sulfur by-product and water.

The dry product gas (stream $d$) may be used as feedstock in catalytic processes for chemical synthesis e.g. to synthesize alcohols, aldehydes, hydrocarbons etc. When substantially pure oxygen is introduced into the gas generator, a substantially pure stream of $H_2$ may be produced. This hydrogen may be reacted with nitrogen over a catalyst to produce ammonia.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, solid carbonaceous fuel having a particle size so that 100% of the material passes through an ASTM E 11-70 Sieve Designation Standard 425 μm (Alternative No. 40) and at least 80% passes through an ASTM E 11-70 Sieve Designation Standard 75 μm (Alternative No. 200). in line 1 is passed into hopper 2 and then through line 3, valve 4, and line 5 into feed lock hopper 6. $CO_2$ gas may be vented from lock hopper 6 during the filling cycle through line 7 with two-way valve 8 open to vent line 11 and closed to line 9. With valve 5 closed, water-free $CO_2$-rich gas is admitted into lock hopper 6 through line 7 by opening two-way valve 8 to line 9 and gas-liquid separation tank 10 while simultaneously shutting off vent line 11. By this means the pressure in the lock hopper 6 is increased to the desired feed pressure. The contents of lock hopper 6 are discharged through lines 15, 16 and valve 13 into slurry tank 17. A water-free $CO_2$-rich liquid from separator tank 10 is introduced into slurry tank 17 by way of lines 20, 21, and valve 22. The $CO_2$-rich liquid and the particles of solid carbonaceous fuel are mixed together with stirrer 23. A uniform pumpable slurry mixture is produced in slurry tank 17 having a temperature in the range of for example above about −69° to 80°F. and a pressure in the range of for example above about 76 to 1000 p.s.i.a. The slurry is quickly introduced into the suction line of feed pump 24.

By means of feed pump 24, the liquid $CO_2$-solid carbonaceous fuel slurry is pumped through line 25, optionally through heat exchanger 26, line 27 and into the annulus 28 of annulus-type burner 30. Heater 26 is preferably a tubular heater. By keeping the lines short and with turbulent flow in the tubular heater, the dispersion of $CO_2$ and solid carbonaceous fuel is prevented from separating. Optionally, dispersant materials may be included in the slurry e.g. particulate carbon. Simultaneously a free-oxygen containing gas in line 35 is passed through the center passage 31 of burner 30. Optionally, additional feed materials such as fuels, temperature moderators, or fluxing agents may be passed through burner 30 either in admixture with the aforesaid feed streams, or separately by way of an outer annulus passage in burner 30 (not shown).

Optionally, the feedstreams may be interchanged. For example, the stream of free-oxygen containing gas is passed through annulus 28 and the other reactant stream may be passed through center passage 31.

Burner 30 is mounted in the upper axially aligned flanged inlet 36 of vertical free-flow synethesis gas generator 37. As previously described, gas generator 37 is a vertical steel pressure vessel. It has a refractory lining 38 and a unobstructed reaction zone 39. The effluent gas leaving the reaction zone passes into a gas cooling zone where it may be cooled by direct or indirect heat exchange with a coolant e.g. water. For example, the gas stream may be passed through passage 40 and into water contained in a quench zone such as quench tank 41. On the way, the gas stream may be sprayed with water from spray ring 42. Thus, water in the quench zone cools the effluent gas stream and scrubs out most of the solid particles i.e. ash and soot. Ash containing some fine particulate carbon particles settles to the bottom of quench tank 41 and may be removed periodically through axially aligned bottom flanged outlet 44, line 45 and a lock hopper system comprising valve 46, line 47, hopper 48, line 49, valve 50, and line 51. The larger particles of soot may form a carbon-water slurry which may be removed from quench zone 41 by way of flanged outlet 55 and line 56. The carbon-water slurry may be sent to a carbon recovery system (not shown) such as a settler where clean water is separated and recycled to orifice scrubber 59 by way of line 60. Clean make-up water may also be introduced through line 60. Optionally, the particulate carbon from the carbon recovery zone is dried, ground, and introduced into hopper 2.

A saturated process gas stream is removed through flanged exit port 65 near the top of quench zone 41 and passed through line 66 into orifice scrubber 59. Any remaining particulate carbon or entrained solids is scrubbed from the process gas stream in orifice scrubber 59 with water from line 60 and optionally dilute carbon-water dispersion from line 67. The mixture of process gas and water leaving orifice scrubber 59 by way of line 68 is passed into gas-liquid separator 69. A first portion of carbon-water dispersion is removed from separator 69 through line 70 at the bottom. This stream may be combined with the carbon-water stream in line 56 and sent to the carbon recovery zone for separation as previously described. Optionally, by means of pump 75 a second portion of the carbon-water stream may be pumped through lines 76–77, and inlet 78 into quench tank 41. A third portion of said carbon-water stream is preferably pumped through line 57, flanged inlet 58, and spray ring 42 into quench zone 41.

Clean process gas saturated with $H_2O$ is removed from the top of separator 69 through line 79 and is passed through heat exchanger 80. There it is heated to a temperature in the range of about 500° to 900°F. by indirect heat exchange with a process gas stream leaving three stage catalytic shift converter 81 through lines 82 and 83 at a temperature in the range of about 600° to 1000°F. Gas cooler 84 situated between beds of conventional water-gas shift catalyst 85 and 86 and cooler 87 situated between conventional catalyst beds 86 and 88 control the exothermic reaction going on in the shift converter by heating boiler feed water flowing indirectly through gas coolers 84 and 87. At least a portion of the preheated process gas stream from heat exchanger 80 enters the first catalyst bed through lines 89 and 90 at the top of the shift converter 81 and flows serially down through the catalyst beds and coolers. Optionally, a portion of the process gas stream in line 89 may be by-passed through lines 91, valve 92 and line 93.

After being cooled in heat exchanger 80, as previously described the process gas stream passes through line 94 and cooler 95 where it is cooled to a temperature below the dew point to condense substantially all of the $H_2O$ from the gas stream. The process gas stream is passed through line 96 into gas-liquid separator 97 where the condensed water is removed through line 98. Then the dry process gas stream is passed through line 99 into the bottom of acid gas scrubbing tower 100 in the gas purification and separation zone.

Included in the gas purification and separation zone are the following equipment: tray-type acid gas scrubbing tower 100 where the process gas stream is scrubbed with at least one solvent absorbent e.g. methanol; related absorbent regenerators 105, 106, and 107; and various associated valves, pumps, coolers, heat exchangers, and reboilers. In the gas separation and purification zone the process gas stream may be split into the following gaseous streams; (a) a $CO_2$-rich stream substantially comprising $CO_2$ and a minor amount of $H_2S$ and COS impurity in line 110, (b) optionally a vent stream comprising $CO_2$ and a trace of $H_2S$ i.e. less than 1–5 ppm of $H_2S$ in line 111, (c) a $H_2S$ rich gaseous stream substantially comprising the remainder of the $H_2S$, substantially all of the COS, and the balance $CO_2$ leaves by way of line 183, and (d) a product gas stream substantially comprising CO and $H_2$ (when the free-oxygen containing gas is substantially pure oxygen) in line 113. Vent stream (b) is optional and may be eliminated.

The process gas stream entering through line 99 into bottom section 115 of acid-gas scrubbing tower 100 is scrubbed with liquid solvent absorbent that enters the tower through line 116 and is distributed by sparger 117, and also by overflow liquid solvent absorbent from plate 118. Liquid solvent absorbent containing most of the $H_2S$ and COS produced in the process is removed from the bottom of tower 100 through line 119 and cooled to a lower temperature and pressure by passage through expansion valve 120. The liquid stream is then passed through line 121, heat exchanger 122, and line 123 into the top plate 124 of solvent absorbent regenerator 107. As the liquid stream descends in column 107, it contacts a vaporized solvent absorbent stream which enters the column from line 125 and passes up the column through openings in bubble caps in the plurality of plates. Condensed liquid absorbent substantially free from $H_2S$, COS and $CO_2$ is removed through line 126 at the bottom of column 107 and pumped by means of pump 127 through lines 128 and 129 into reboiler 130 where it is heated and vaporized. The vaporized absorbent stream is then introduced into column 107, as previously described. Regenerated liquid solvent absorbent is recycled to acid gas scrubbing tower 100 by way of line 128, line 180, heat exchanger 122, line 181, cooler 182 and line 116. An $H_2S$-rich gas stream containing gases from the group COS, $CO_2$, and mixtures thereof leaves from line 183 at the top of regenerator 107 and may be sent to a Claus unit for the production of by-product solid sulfur.

The liquid solvent absorbent on intermediate plate 131 in column 100 contains $CO_2$ and some $H_2S$ and COS. To prevent build-up of these acid-gases in the system, this liquid solvent absorbent may be withdrawn through line 140 and regenerated in absorbent regenerator 105 in a similar manner as that described previously for the liquid solvent absorbent withdrawn from the bottom of tower 100 through line 119. The vent gas stream comprising $CO_2$, $H_2S$, and COS leaves absorbent regenerator 105 by way of line 111. The regenerated liquid solvent absorbent is recycled to tower 100 and enters through line 141 near the top.

The liquid solvent absorbent on plate 118 in column 100 is rich in $CO_2$ and contains a minor amount of $H_2S$. This liquid solvent absorbent is withdrawn through line 142 and regenerated in absorbent regenerator 106 in a similar manner as described previously for the liquid solvent absorbent withdrawn from the bottom of tower 100 through line 119. The regenerated liquid solvent absorbent is recycled to tower 100 and enters through line 143.

The $CO_2$-rich gas stream which leaves from line 110 at the top of absorbent regenerator 106, optionally in admixture with vent gas mixture 111, is cooled in cooler 144 and supplied to compressor 145 by way of lines 146 and 147. This gas stream is compressed in compressor 145 which is driven by motor 148. The compressed gas in line 149 is cooled below the liquefaction temperature in cooler 150, and passed through line 151, heat exchanger 152, line 153, expansion valve 154, and line 155 into gas-liquid separating tank 156. Expansion valve 154 may alternately be an expansion turbine. Liquid $CO_2$ is withdrawn through line 157 by pump 158 and passed through line 159 into gas-liquid separating tank 10. Water-free $CO_2$-rich liquid is withdrawn through line 20 at the bottom of gas-liquid separating tank 10 and as previously described passed into slurry tank 17 as the slurrying medium. $CO_2$ gas leaving from the top of separating tank 156 is recycled through line 165, heat exchanger 152, and lines 166, 167, and 147 into compressor 145. Optionally, a comparable dry $CO_2$-rich gas stream from an external source comprising at least 50 mol % $CO_2$ may be introduced into the system by way of lines 168–169 and valve 170 in place of all or a portion of the $CO_2$-rich gas stream from line 146.

In a preferred embodiment of the process, the pressure in all steps of the process starting with the step of mixing liquid $CO_2$ and solid carbonaceous fuel in slurry tank 17 is substantially the same less ordinary drop in the line and equipment. This affords a great economic advantage since expensive gas compressors are not needed in the subject process.

EXAMPLES

The following examples illustrate preferred embodiments of the process of this invention. While preferred modes of operation are illustrated, the examples should not be construed as limiting the scope of the invention. The process is continuous and the flow rates are specified on an hourly basis for all streams of materials.

EXAMPLE I 26,077 lbs. of dry Bituminous coal ground to a particle size so that 100% of the material passes through an ASTM E 11-70 Sieve Designation Standard 425 μm (Alternative No. 40) and at least 80% passes through an ASTM E 11-70 Sieve Designation Standard 75 μm (Alternative No. 200) are introduced into a pressurized slurry mixing tank by way of a lock hopper. The ultimate analysis of the coal in weight percent is C 72.75, H 5.24, N 1.64, S 3.35, and O 7.65. The ash content is 9.37 wt. %. 25,765 lbs. of a substantially water-free $CO_2$-rich liquid slurrying medium preferably produced subsequently in the process as described in Example II and comprising in mole % $CO_2$ 95.8 and $H_2S$ 4.2 at a temperature of 32°F. are introduced into the slurry tank and mixed with the ground coal. A pumpable slurry of liquid $CO_2$ and ground coal is thereby produced at a temperature of about 32°F. and a pressure of about 500 p.s.i.a. The solids content of the slurry is about 50 wt.%.

The slurry is pumped through a heater where its temperature is increased to 100°F. and a dense phase gas-liquid feed dispersion of $CO_2$ and particles of coal and soot is produced. A reactant stream comprising said dispersion is then passed into a reaction zone of a gas generator by way of the annulus of an annulus-type burner which is axially mounted in the upper flanged inlet. The gas generator is an unobstructed refractory lined pressure vessel and is free from commercial catalyst. The solid carbonaceous fuel reactant may naturally contain as impurities some elements which may have some catalytic effect. A typical gas generator having an upper reaction chamber, a lower quench chamber, and an axial passage through which the effluent gas from the reaction chamber may pass into water in the quench chamber is shown in the drawing. Simultaneously, a reactant stream of substantially pure oxygen i.e. 99.5 mole % $O_2$, is passed through the central passage of said burner. The reactant streams impinge and mix with each other in the reaction zone producing a uniform dispersion of oxygen, coal particles, and $CO_2$.

In the reaction zone, the atomic ratio of oxygen in the substantially pure oxygen plus organic oxygen in the coal to carbon in the coal is about 0.9; the weight ratio of $CO_2$ to coal in the feedstream is about 1; the temperature is about 2600°F; and the pressure is about 600 p.s.i.a. The coal particles are reacted with oxygen by partial oxidation and with $CO_2$. The $CO_2$ serves as a carrier for the coal particles and as a temperature moderator. The CO-rich effluent gas from the reaction zone is cooled and cleaned in a quench zone by passing it through a water spray. It is then cooled in quench water in the lower quench chamber of the gas generator. The water spray and scrubbing action that occurs as the effluent gas passes through the quench zone scrubs out most of the ash and particulate carbon soot. A 2 wt. % carbon-ash-water dispersion is drawn off from the bottom of the quench tank and sent to a separation zone. Clear water is separated and used for additional gas scrubbing. About 1500 lbs. of relatively low ash particulate carbon soot is recovered and dried by conventional means. Optionally, this dry soot and ash may be admixed with the dry fresh ground coal feed to the slurry tank; or it may be admixed with feed to the grinding system. About 1325 lbs. of ash having the following composition in wt. % is removed periodically from the bottom of the quench zone by way of a lock hopper system: ash 82, C 16.8, H 0.2, S 1.0.

The process gas stream leaving the quench zone is saturated with steam; and it is at a temperature of about 425°F. and a pressure of 600 p.s.i.a. About 1000 parts per million of soot is removed from this gas stream by scrubbing with water in a conventional orifice scrubber. By the aforesaid process about 1,000,000 SCF of dry CO-rich product gas stream is produced containing about 1,400,000 SCF of steam having the following composition in mole %: CO 67.46, $H_2$ 16.30, $CO_2$ 13.03, $CH_4$ 0.50, $H_2S$ 1.65, COS 0.34, A 0.14 and $N_2$ 0.58.

EXAMPLE II

This example describes the additional steps for producing a $CO_2$-rich liquid stream downstream from the process described in Example I and recycling said $CO_2$-rich liquid stream back to said slurry tank as the slurrying medium described in Example I. 994,800 SCF (dry basis) of CO-rich saturated product gas steam from Example I are heated to a temperature of 550°F. by indirect heat exchange with the effluent gas leaving a conventional water-gas shift converter filled with CoMo shift catalyst. The heated feed gas is passed serially through three beds of said water-gas shift catalyst. Cooling means are provided after the first and second beds to control the temperature. Space velocities vary in the range of 8000 standard volumes of gas per volume of catalyst per hour (v/v/hr.) in the first bed to 2000 v/v/hr. in the last bed. The exit temperature of the process gas stream is about 625°F. By two heat change steps, the first with incoming feed gas to the shift converter and the second with cooling water, the process gas stream is reduced to a temperature below the dew point i.e. about 150°F. After water is removed, the process gas stream has the following composition in mole %: CO 4.48, $H_2$ 47.77, $CO_2$ 45.75, $CH_4$ 0.31, $H_2S$ 1.21, COS 0.02, A 0.10, and $N_2$ 0.36.

The process gas stream is then processed in an acid-gas scrubbing and fractionation tower with a methanol solvent and is separated into the following streams free from $H_2O$: (a) 844,000 SCF of a product gas stream comprising in mole % $H_2$ 90.2, CO 8.4, $N_2$+A 0.85 and $CH_4$ 0.58; (b) 224,000 SCF of a $CO_2$-rich recycle gas steam comprising in mole % $CO_2$ 95.8 and $H_2S$ 4.2; (c) 497,900 SCF of a $CO_2$-rich vent gas stream comprising in mole % $CO_2$ 99.77, CO 0.08, and $H_2$ 0.15; and (d) a $H_2S$-rich gas stream comprising in mole % $H_2S$ 35.14, $CO_2$ 63.51 and COS 1.35.

The $CO_2$-rich recycle gas stream (stream (b) is compressed, and cooled to produce the $CO_2$-rich liquid slurrying medium that is introduced into the slurry tank as previously described and $CO_2$ gas for pressurizing the lock hopper. The $H_2S$-rich gas stream (d) is sent to a Claus unit for sulfur recovery.

The process of the invention has been described generally and by example with reference to liquid $CO_2$-solid carbonaceous fuel feedstocks as well as dense phase gas-liquid feed dispersions of $CO_2$ and particles of solid carbonaceous fuel of particular compositions for purposes of clarity and illustration only. It will be apparent to those skilled in the art from the foregoing that the various modifications of the process and the materials disclosed herein can be made without departure from the spirit of the invention.

We claim:

1. A process for producing a gas stream principally comprising gases selected from the group consisting of CO, $CO_2$, $H_2$, $H_2O$, $CH_4$, $H_2S$, COS, $N_2$, A, and mixtures thereof comprising:
   1. mixing liquid $CO_2$ and solid particles of carbonaceous fuel together in a mixing zone at a temperature in the range of above about $-69°$ to 80°F. and a pressure in the range of about above the triple point pressure of carbon dioxide to about 1000 psia to produce a substantially water-free pumpable slurry;
   2. introducing the mixture from (1) at a temperature in the range of about about $-69°$ to 1200°F. and pressure in the range of above about 76 to 4500 psia, and simultaneously introducing a stream of free-oxygen containing gas selected from the group consisting of air, oxygen-enriched air (greater than 21 mole % $O_2$), and substantially pure oxygen (greater than 95 mole % $O_2$) at a temperature in the range of about 80 to 500°F. and a pressure in the range of above about 76 to 4500 psia, into the reaction zone of a free-flow noncatalytic gas generator; and
   3. reacting said carbonaceous fuel and free-oxygen containing gas by partial oxidation in said reaction zone at an autogenous temperature in the range of about 1200° to 3000°F. and a pressure in the range of above about 30 to 4400 psia to produce said product gas stream.

2. The process of claim 1 wherein the weight ratio of $CO_2$ to carbonaceous fuel in step (1) is in the range of about 0.6 to 2.0.

3. The process of claim 1 wherein $H_2O$ at a temperature in the range of about 50 to 1000°F. and in an amount to provide a weight ratio $H_2O$ to carbonaceous fuel in the range of 0.01 to 0.15 is introduced into the reaction zone in step (2).

4. The process of claim 1 wherein the ratio of atoms of oxygen in the free-oxygen containing gas plus atoms of organically combined oxygen in the carbonaceous fuel to the atoms of carbon in the carbonaceous fuel is in the range of about 0.7 to 1.6.

5. The process of claim 1 wherein the slurry in step (1) has an apparent viscosity in the range of about 50 to 1000 centipoise.

6. The process of claim 1 wherein said solid carbonaceous fuel is selected from the group consisting of coal, coke from coal, char from coal, petroleum coke, particulate carbon soot, oil shale, tar sands, asphalt, pitch, lignite, rubber, rubber tires and mixtures thereof.

7. The process of claim 6 wherein said carbonaceous fuel has a particle size such that 100% of the material passes through an ASTM E 11-70 Sieve Designation Standard 425 $\mu$m (Alternative No. 40) and at least 80% passes through an ASTM E 11-70 Sieve Designation Standard 75 $\mu$m (Alternative No. 200).

8. A process for producing synthesis or fuel gas mixtures from solid carbonaceous fuels comprising:
   1. mixing together to produce a substantially water free pumpable slurry, a liquid $CO_2$-rich stream and a solid carbonaceous fuel having a particle size such that 100% of the material passes through an ASTM E 11-70 Sieve Designation Standard 425 $\mu$m (Alternative No. 40) and at least 80% passes through an ASTM E 11-70 Sieve Designation Standard 75 $\mu$m (Alternative No. 200), in a mixing zone at a temperature in the range of above about $-69°$ to 80°F. and a pressure in the range of above about 76 p.s.i.a. to 4500 psia. and wherein the weight ratio of $CO_2$ to solid carbonaceous fuel is in the range of about 0.6 to 2.0;
   2. preheating the mixture from (1) to a temperature in the range of about 100° to 900°F. to produce a dense phase gas-liquid dispersion of solid carbonaceous fuel in $CO_2$ carrier;
   3. reacting the dispersion from (2) with a free-oxygen containing gas selected from the group consisting of air, oxygen-enriched air (greater than 21 mole % $O_2$), and substantially pure oxygen (greater than 95 mole % $O_2$) in the reaction zone of a free-flow noncatalytic gas generator at an autogenous temperature in the range of about 1200° to 3000°F. and a pressure in the range of above about 30 to 4400 psia, to produce an effluent gas stream comprising a mixture of gases from the group CO, $CO_2$, $H_2$, $H_2O$, $CH_4$, $H_2S$, COS, $N_2$, A, and mixtures thereof, and containing entrained solid particles; and wherein the ratio of atoms of oxygen in the free-oxygen containing gas plus atoms of organically combined oxygen in the solid carbonaceous fuel to the atoms of carbon in the carbonaceous fuel is in the range of about 0.7 to 1.6;
   4. cooling and cleaning the effluent gas stream from (3) and separating said entrained solid particles to produce a clean process gas stream;
   5. increasing the $H_2$/CO mole ratio of the clean process gas stream from (4) by subjecting at least a portion of said process gas stream to the water-gas shift reaction;
   6. purifying and separating the process gas stream from (5) in a gas purification and separation zone into the following gaseous streams: (a) a dry $CO_2$-rich stream substantially comprising $CO_2$ and minor amounts of $H_2S$ and COS impurities, (b) optionally, a vent stream substantially comprising $CO_2$ and a trace of $H_2S$, (c) a dry $H_2S$-rich gaseous stream substantially comprising the remainder of all of the $H_2S$ produced, substantially all of the COS produced and $CO_2$, and (d) a dry product gas stream comprising gases selected from the group consisting of CO, $H_2$, $CH_4$, A, $N_2$, and mixtures thereof;
   7. liquefying the dry $CO_2$-rich stream (6) (a) in a gas liquefication zone; and
   8. introducing at least a portion of said liquid $CO_2$-stream from (7) into (1) as said liquid $CO_2$-rich stream.

9. The process of claim 8 where in step (6) the dry $CO_2$-rich stream (a) and at least a portion of the vent stream (b) are removed from the gas purification and separation zone as a combined stream which is liquefied in step (7).

10. The process of claim 8 wherein said solid carbonaceous fuel is selected from the group consisting of coal, coke from coal, char from coal, petroleum coke, particulate carbon soot, oil shale, tar sands, asphalt, pitch, rubber, rubber tires, and mixtures thereof.

11. The process of claim 8 wherein the cooling and cleaning in step (4) is effected by quenching the effluent gas stream from step (3) in water and scrubbing with water in a scrubbing zone, thereby saturating the process gas stream with water and providing supplemental $H_2O$ in the process gas stream for catalytic water-gas shift reaction in step (5).

12. The process of claim 8 wherein the cooling and cleaning in step (4) is effected by indirect heat exchange in a waste heat boiler and with scrubbing with water in a scrubbing zone, thereby providing supplemental $H_2O$ in the process gas stream for catalytic water-gas shift reaction in step (5).

* * * * *